United States Patent

McGough

[11] Patent Number: 6,058,189
[45] Date of Patent: May 2, 2000

[54] METHOD AND SYSTEM FOR PERFORMING SECURE ELECTRONIC MONETARY TRANSACTIONS

[75] Inventor: Paul McGough, Centreville, Va.

[73] Assignee: Secure Choice LLC, Chautilly, Va.

[21] Appl. No.: 08/879,708

[22] Filed: Jun. 20, 1997

[51] Int. Cl.[7] .................................................. H04L 9/28
[52] U.S. Cl. ............................................................ 380/28
[58] Field of Search ................................ 380/28, 268, 42

[56] References Cited

U.S. PATENT DOCUMENTS

| | | | |
|---|---|---|---|
| 4,068,089 | 1/1978 | Maeda et al. ............................ | 395/158 |
| 4,087,626 | 5/1978 | Klingler et al. ......................... | 364/514 |
| 4,133,973 | 1/1979 | Bates et al. ........................... | 395/343 X |
| 4,333,090 | 6/1982 | Rayner .................................... | 395/154 |
| 4,479,112 | 10/1984 | Mackinlay .............................. | 395/152 |
| 5,754,652 | 5/1998 | Wilfong ................................... | 380/24 |

OTHER PUBLICATIONS

Millikin, D.D.: Elementary Cryptography and Cryptanalysis, (1943), pp. 88–90, Aegean Park Press.

*Primary Examiner*—Gail O. Hayes
*Assistant Examiner*—Ho S. Song
*Attorney, Agent, or Firm*—Michael P. Fortkoit; Mayer, Fortkort & Williams, LLC

[57] ABSTRACT

A secure electronic monetary transaction system (SEMTS) provides absolute security for electronic financial transactions. These transactions can be of any kind provided they are numeric in content and of known length. The SEMTS encrypts and decrypts source numeric data using a private, numeric key known only by both parties in the transaction. The secure distribution of these keys will be under the same methods that the financial institutions use to distribute the original source data such as credit cards, account numbers, etc. The system uses nine simple, open formulas for translating source numbers into encrypted cipher numbers. These formulas return every possible value, except the input value, and are completely dependent on the key. Because there are no hidden parts, the architecture of the SEMTS is completely available to anyone in the public sector. This open architecture makes stealing the cipher numbers worthless. The only way to break a number is to know the key. The only way to get the key is to physically steal it, which is the exact same risk entailed in the original source, e.g., a credit card. The total openness and absolute security delivered by the SEMTS is what is missing in all other available financial transaction schemes, and it is what is required by the public to have complete confidence in electronic financial transactions.

6 Claims, 3 Drawing Sheets

METHOD AND SYSTEM FOR PERFORMING SECURE ELECTRONIC MONETARY TRANSACTIONS

BACKGROUND OF THE INVENTION

The present invention relates generally to methods and systems for performing secure electronic transactions, and more particularly to a method and system for performing secure electronic transaction for positively securing electronic monetary transactions between two public entities for any n digit electronic "money"; e.g., bank account numbers, credit card numbers, fund amounts, etc.

Existing secure transaction systems include private and public key encryption systems. These types of systems rely on creating sufficiently large codewords such that the time required to break the code by simply trying all possibilities is extremely large.

Securing an information transfer between two public entities can be done in a variety of ways. But no matter what manner is chosen, the goal is to positively transfer the information through the public sector without the information being discovered and used by anyone other than the intended recipient. This need for a positive and secure transfer increases significantly along with the value of the information being passed. Various systems have been developed through the years to perform these transfers and the public record is well documented with both success and failures. The major component of almost every system developed is an encryption key that is used to translate information from source text to cipher text and back to source text.

An information transfer key is just like a physical one. It is used to unlock, in this case secure data. All modern secure systems use keys of one type or another. The only difference between a transaction key and a physical one is that besides losing it or having it stolen, it can also be derived ("broken") or discovered. The major weakness with public transfer of information is key discovery—not the physical issues with loss or theft, which are faults that cannot be removed from any key-based system, but deriving and using a key without authorization.

The current electronic age has ushered in a dramatic increase in the need for secure monetary transactions, and new methodologies have been developed in an attempt to meet the demand. The main new weapons that have been unveiled are systems based on a concept called Public Key Encryption (PKE). These systems were developed to solve the supposed faults of the private key methods used in the past. A private key system is one in which only those who intend to share information all posses the same key. The private key systems supposedly have a major fault: the secure distribution of the private key to the intended recipients and only to those recipients.

PKE introduced a concept in which there are dual keys— one public and one private. The public key is freely distributed to anyone who wishes to transfer information to the entity holding the single private key. This dual key approach therefore solves the fault by not having to distribute a private key. The entire basis for PKE methods is the mathematically large disparity between decrypting the cipher text created with the public key using the PKE private key, which is very rapid and simple to do (polynomial time computation), and working through the possibilities without the key, which theoretically takes a very long time (factoring, requiring exponential time computation). These systems are theoretically secure because the combination of the public key and the source information generate this theoretically long time to factor the possibilities without the PKE private key. The reason this is theoretical is that it is possible to develop a unique set of mathematical equations or even a single algorithm for either mimicking or rapidly factoring an integer in polynomial time, although no solution has been published to date. Alternatively, faster computers are always shortening the problem. Proposals have even been made to develop "quantum computers" that would perform these computations in a fraction of the expected time. Consequently, the controversial issue with these methods is that if the math were to be developed, or the shortcut found, then the security of these PKE systems completely and instantly evaporates.

The fundamental problem with these PKE systems is that they have been introduced as saviors of the faults of a private key system. While supposedly solving this problem, they have introduced uncertainty into the core issue with all encryption systems: unauthorized discovery of the key— now matter how sophisticated the mathematics. So what really has been accomplished? The answer, for the domain of electronic monetary transactions, is nothing of consequence.

The present invention is therefore directed to the problem of developing a system for performing secure electronic transactions that reduce code breaking to merely guessing the code used or the message sent, but which cannot be solved mathematically and that uses an architecture that is completely open.

SUMMARY OF THE INVENTION

The present invention solves this problem by providing a secure electronic transaction system that employs a series of equations, one of which is used for each digit of the source message, that converts the source digit to a new digit. To decode the message, one must know the exact equations used for each digit to encode the message, which, depending upon the number of equations used, can be made equal to the number of digits in the "alphabet," thus limiting the code breaking to merely attempting to guess the actual digits sent.

Unlike current public key encryption technology and methodology, the present invention does not rely on theoretical probabilities or computational time differences for measuring security. Instead, the present invention uses a completely open architecture that has no theory involved; therefore there is no reverse action for "breaking the code." The mathematical formulas used to encrypt source information into secure cipher text are simple and work identically for both of the two public entities transferring data. But decrypting the cipher text back into source data simply cannot be done without the private key, which determines what formula is used for each monetary number. The present invention is therefore a private key encryption system that completely secures any electronic n digit financial transaction.

The system of the present invention is a combination of mathematical formulas and software code processes for the encryption and decryption of any n digit financial transaction. There are nine simple math formulas and two core software processes to accomplish the secure distribution of the source monetary messages. In order to use the system, step one is to establish the finite limit of the potential length of any transaction message that will be sent between two public entities. Next, the establishment of the length of the private key to be used by both parties must be made. This will be dependent on the desired number of "skip" values to be introduced. (Skip values increase the odds of guessing the correct decryption to well beyond guessing the original source "alphabet" itself.) Then the secure external distribution of the keys will be made. Finally, the system of the present invention can be used to send messages between the parties based on the financial "alphabet" that is encrypted using the established keys.

The present invention provides a completely open messaging architecture between two public entities so that captured or stolen monetary messages have no meaning or value—they cannot be derived or discovered. In addition, the present invention delivers a very simple mathematical foundation for the system for straightforward comprehension of the method—no theory is involved. The present invention also provides confidence to the public that using such a system has no induced, real or imagined weaknesses exposing their money to theft. Finally, the present invention makes the system small and self-contained so that it can be delivered to financial institutions and incorporated into their existing systems providing complete secure transactions.

DETAILED DESCRIPTION

Figure 1:
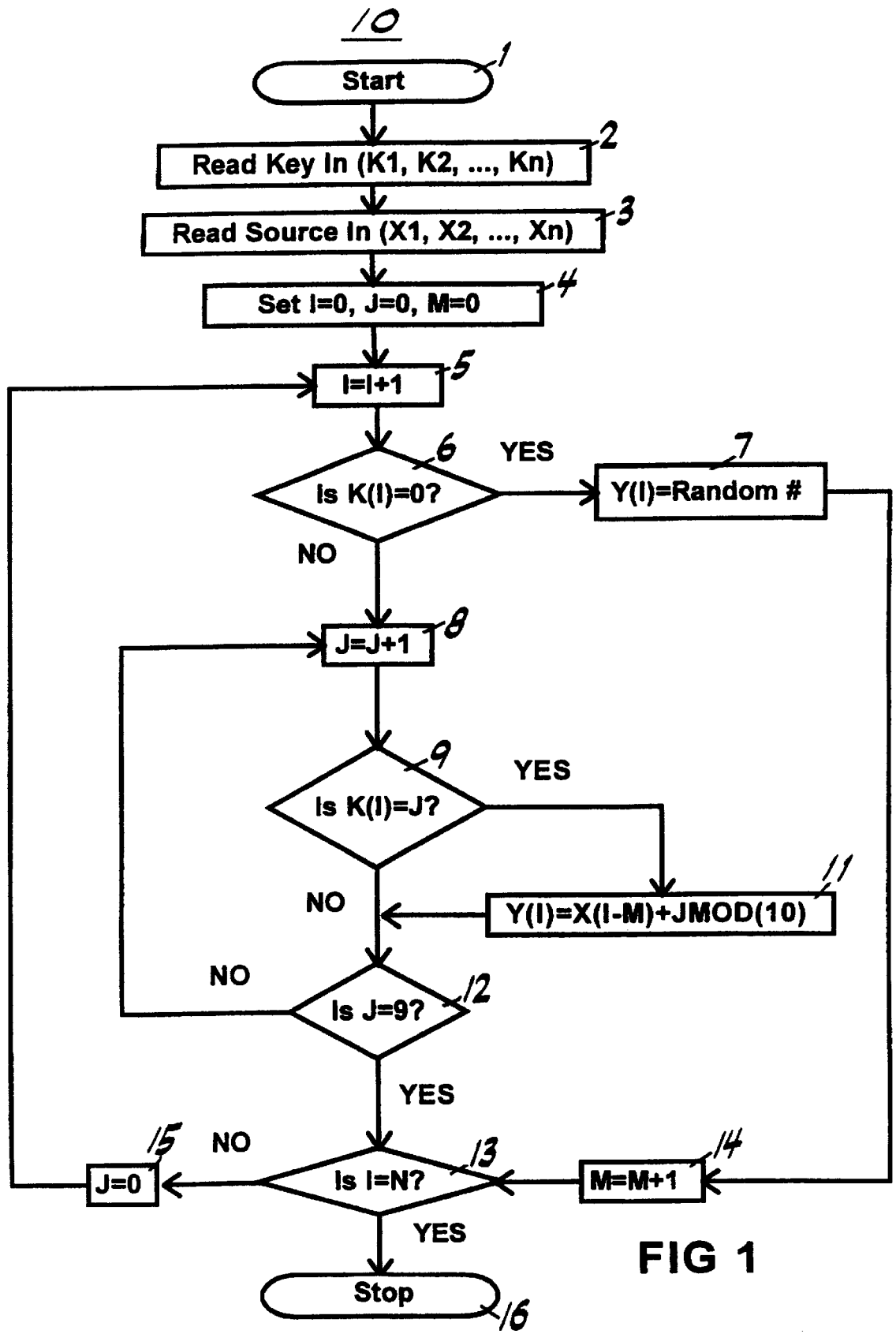
FIG. 1 depicts a flow chart for encrypting a source message according to the method of the present invention.

In order to uncover a system of real capability and security for electronic monetary transactions, it is crucial to understand a single concept: that the "alphabet" for sending monetary information messages between two public entities is composed of only numerals, 0 through 9. The entire set of characters, punctuation values, etc. are of no consequence to monetary transactions. Electronic "money" only has value if one can associate the account number with the correct person. And securing the person is impossible—everybody knows how to find free, available information on just about anyone. So keeping the "money" number separate and secure from the individual is the real goal of any electronic monetary transaction.

Understanding this concept is paramount to meeting the real goal of any encryption system—making key derivation impossible. And in order to meet that goal, the system must have an open architecture so that when an unauthorized derivation is attempted with all of the available information, there are simply no derivation techniques to apply. The derivation is limited to a guess. If the open system can be accomplished, then the single point of failure will not be in the derivation of the key, but rather back to the distribution of it, and that has nothing to do with introducing new mathematics. The answer to that, for electronic monetary transactions, is that distribution of the private key should be identically secure to the distribution of the original source "money"—which is going to be the "alphabet" for sending any new messages between two entities. A credit card number is the "alphabet" for sending future transaction messages between buyer and seller. If it can be securely distributed to its owner, then the same method should certainly cover the distribution of the private electronic key.

So now the need becomes designing and distributing an open architecture system that has no key derivation possibilities. To do so, the system must use an "ideal key." An ideal key is one that when applied to any source information, the resulting cipher text is rendered completely unbreakable. The cipher text must have an extremely high number of possible outcomes, limiting derivation to a guess. An example would be if the source information is "12345", and the encrypted cipher text is "88888." The key is "76543" and the process (mathematics) for producing the cipher text is simple addition. Even if an unauthorized user knew the mathematics, decryption is still impossible without the key—it is limited to a guess. Therefore, using simple, open math becomes practical, provided one can develop the ideal key.

From this example, one can see that an ideal key is one in which every unique piece of information has a corresponding unique piece of the key to use for changing it to cipher text; e.g., the first trait of an ideal key is that it is as long as or longer than the source information. This means that instead of encrypting all source information "1"s into the same cipher text of say "7"s, each "1" would become something unique. The first one is "3," the second one "7," the third "9," etc. This creates havoc in attempting to discover a key from known source information. Knowing that the first number in the source information is a "1" and that it is a "3" in the cipher text doesn't help in finding another "1," if the second instance isn't a "3" also. This first trait of an ideal key is unrealistic for character-based information messages because they vary in length and working with a key of equal or longer length than the message would be unmanageable—unless the information is of finite length, which is generally the case for numeric, monetary messages.

The second trait of an ideal key would be to translate a "1" into "4," and to translate a "2" into a "4" also, just like our example cipher text was all "8s." This would mean that it would be impossible to discover the key without first knowing each and every individual message's content—which means you wouldn't be trying to break the code! E.g., if the cipher text read "444," it would be impossible to discover a key that decrypted that message into "630" instead of "287" or any other three numbers. This trait is also unrealistic in that it is only applicable if the first unrealistic trait is available; e.g., in order to have all pieces of information translate to the same cipher text, the key must contain values for all possible pieces of information and be as long as the message in order to find the unique decryption within the key. This trait can also be delivered if the information is monetary, because there are only 10 numerals available, making a one to one correspondence between a key digit and source digit possible—and numbers are universal for all languages.

Meeting the real goal of secure, public encryption of electronic monetary transactions is then possible using a private key system, where the key is "ideal," the mathematics are simple and open to all, and unauthorized use of the cipher text message content is reduced to an improbable guess—which is exactly like guessing the original "money" number in the first place. The present invention is just such a system, and it truly secures any n digit financial transaction.

The secure electronic monetary transaction system (SEMTS) of the present invention is designed to secure a financial transaction of any n digit account number, credit card, etc. The system uses nine simple mathematical formulas to translate a number into another number. Deciding which formula to use for each digit to be secured comes from the established key for that transaction. This translated number is then sent into the public domain to be received by the intended recipient. The recipient then uses the key to know which formula to use to translate the cipher text number back into the original number. The system delivers security because every number can be returned by every formula, except itself.

The nine formulas are:
1. x+1 MOD(10)
2. x+2 MOD(10)
3. x+3 MOD(10)
4. x+4 MOD(10)
5. x+5 MOD(10)
6. x+6 MOD(10)
7. x+7 MOD(10)
8. x+8 MOD(10)
9. x+9 MOD(10)

in which x is the number to be secured. Alternatively, the formulas could be written more generally as:
1. x+n MOD(10)
2. x+(n+1) MOD(10)
3. x+(n+2) MOD(10)
4. x+(n+3) MOD(10)
5. x+(n+4) MOD(10)
6. x+(n+5) MOD(10)
7. x+(n+6) MOD(10)
8. x+(n+7) MOD(10)
9. x+(n+8) MOD(10)

where $n \geq 0$.

The formula number to use to secure a digit would correspond to the number in the key, from 1–9. All formulas accept a single digit, and return a single digit. Therefore, the encrypted cipher text total transaction number length is identical to the number of digits to be secured. When the key contains the number 0 (zero), then this is a "skip" value. E.g., there is no formula to use, so the returned value is a random number between 0 and 9. When decrypting this number, it is skipped over because it is not significant and not a part of the original transaction value, hence the term "skip value."

The total set of possible original transaction numbers and their formula return values appear in the following chart:

| Input Value | 0 | 1 | 2 | 3 | 4 | 5 | 6 | 7 | 8 | 9 |
|---|---|---|---|---|---|---|---|---|---|---|
| Formula | | | | | Return Values | | | | | |
| #1 | 1 | 2 | 3 | 4 | 5 | 6 | 7 | 8 | 9 | 0 |
| #2 | 2 | 3 | 4 | 5 | 6 | 7 | 8 | 9 | 0 | 1 |
| #3 | 3 | 4 | 5 | 6 | 7 | 8 | 9 | 0 | 1 | 2 |
| #4 | 4 | 5 | 6 | 7 | 8 | 9 | 0 | 1 | 2 | 3 |
| #5 | 5 | 6 | 7 | 8 | 9 | 0 | 1 | 2 | 3 | 4 |
| #6 | 6 | 7 | 8 | 9 | 0 | 1 | 2 | 3 | 4 | 5 |
| #7 | 7 | 8 | 9 | 0 | 1 | 2 | 3 | 4 | 5 | 6 |
| #8 | 8 | 9 | 0 | 1 | 2 | 3 | 4 | 5 | 6 | 7 |
| #9 | 9 | 0 | 1 | 2 | 3 | 4 | 5 | 6 | 7 | 8 |

Each input value returns every other number. This means that if you know that the return value is a "5," the input value could have been any other number, e.g., 9 possibilities, 0 through 4 and 6 through 9, but not a 5.

The SEMTS translates input values into return values by using the private transaction key. If the key value is "7," and the input value is "9," then the returned cipher text would be "6." In order to determine what the input value was for a cipher text returned value of "6," one must know that the formula used was #7 in order to retrieve the proper input value of "9"; otherwise one simply has to guess that the input value was a 0, or 1, or 2, or 3, or 4, or 5, not a 6, but it could have been a 7, or an 8 or a 9. This means that if you "stole" the message going from one entity to another and knew that the return value was a "6" but did not have the key, then your odds of guessing the input value are 1 in 9; guessing the original number, without knowing or stealing the returned value, is 1 in 10. Stealing the returned value only decreases your odds of guessing from 1 in 10 to 1 in 9. In order to recapture this lost, though insignificant chance, the skip values add even further odds of guessing the correct number, not in individual returns, but in the total return value of n digits.

EXAMPLE

The following is an example to clarify the formula and key system.

COMPANY_A and PERSON_B are two public entities who wish to perform a financial transaction securely amongst themselves; e.g., the person wishes to buy a product, electronically, from the company and will use a credit card to do so. It is a known fact that the financial "alphabet" to use for this transaction is a 5 digit credit card number. It is finite and contains only a number, so the two fundamental conditions of the present invention are met. (Credit cards are minimally 13 digits in length, but for the sake of simplicity in this example, the length will be 5. The length of the transaction "alphabet" determines the length of the key, but has no limit; the only condition is that the length is finite.) The company and person decide to use a 7 digit key, which can then contain up to 2 skip values in the encryption. The credit card number is "38026" and the key value that is securely distributed from COMPANY_A to PERSON_B is "5907338".

When the financial transaction occurs:
First, PERSON_B's encryption system encrypts the credit card number using the key value to determine which formulas are used for each digit of the card. For card number "3," using formula #5 (key value "5"), the encrypted return value is "8." For the next card number "8," using formula #9, the encrypted return value is "7." For the next card number "0," the key calls for using formula #0, which doesn't exist. So this is a skip value, and a random number is returned, say "4." Now the next key number should be used for this digit, and that is key value "7," so formula #7 will be used for card digit "0"; the encrypted return value is "7." For the next card number "2," using formula #3, the encrypted return value is "5." For the next card number "6," using formula #3, the encrypted return value is "9." Now there are no more card numbers, but still key values. The SEMTS will return an additional random number (for our example, a "0") for every key value remaining so that the complete encrypted cipher text for all transactions is identical in length to the key value. This helps to protect the location and number of skip values in the key, though discovering this does not significantly impact the security of the transaction; it just returns the odds of guessing back to 1 in 9 instead of 1 in 10 for each digit. The final encrypted cipher text is "8747590."

In order to discover or derive the original credit numbers, without knowing that the key value is "5907338," one can only guess. There is nothing in the present invention that allows reverse engineering or code breaking. Stealing the message will give one the cipher text number; knowing the system makes it impossible to do anything other than guess. E.g., the first cipher text number "8" indicates that the original number is NOT an "8," because any original number cannot return itself. But an "8" can be returned by every other possible original number; therefore the odds of "breaking" the code (guessing) for the first and every subsequent digit are 1 in 9.

The total odds for guessing the entire credit card number are the number of arrangements. In our example, there are seven digits in the cipher text. It is not known which are significant, so there are 9 possibilities for 7 places. Arrangements are figured as: (# of possible digits for first key value) (# of possible digits for next key value) . . . (# of possible digits for last key value). This equates to (9)(9)(9)(9)(9)(9)(9)=4,782,969. The total possible odds of guessing the original credit card number are (10) (10) (10) (10) (10), which is 100,000. Thus, the present invention has returned a significantly higher number of possibilities than the original source credit card. That is delivering true security for numeric financial transactions.

To decode the cipher text "8747590" one must know the key value is "5907338." Essentially, the same technique is used. The first digit of the key "5" indicates that formula five was used to encode this, hence the table shows that for a return value of "8" the input value was "3." The next digit of the key indicates that formula nine was used, and since the return value is "7" the input value was "8." The next digit of the key indicates that formula zero was used, but since there is no formula zero, this means that the corresponding digit of the cipher text is a random number (i.e., a skip value) and should be discarded. The next digit of the key indicates that formula seven was used, and since the return value is "7" the input value was "0." The next digit of the key indicates that formula three was used, and since the return value is "5" the input value was "2." The next digit of the key indicates that formula three was used, and since the return value is "9" the input value was "6." Finally, the last digit is discarded as the system knows that only five digits were sent.

As an alternative to looking the value up in the table, the decryption process can implement the following equations:

1. y+10−n MOD(10)
2. y+10−(n+1) MOD(10)
3. y+10−(n+2) MOD(10)
4. y+10−(n+3) MOD(10)
5. y+10−(n+4) MOD(10)
6. y+10−(n+5) MOD(10)
7. y+10−(n+6) MOD(10)
8. y+10−(n+7) MOD(10)
9. y+10−(n+8) MOD(10)

where n≧0.

In this case, the addition of the 10 merely shifts the resulting addition upwards so that it remains positive, and has no effect otherwise on the outcome due to the modular summation.

Encryption Process

FIG. 1 depicts a flow chart of the method of the present invention for encrypting the source message 10. Initially, the Key (K1, K2, . . . , Kn) is read into memory in step 2, which is followed by a reading of the source message into memory 3. The counters (I, J) are then initialized 4, and the main counter (I) is incremented by one 5, since we are counting the digits and keys with ordinal numbers. Next, the method tests whether the key for the ith position is zero 6. If so, a random number is generated or recalled from a table 7 and placed in the cipher text message in the ith position (Y(I)). If not, the process continues to step 8, in which the key counter (J) is incremented. Next, the Key is tested for each successive digit 9, using the key counter (J). Once a match is found (branch YES in step 9), the following formula is now implemented 11:

$$Y(I)=X(I-M)+J \ MOD(10).$$

The key counter (J) is then tested 12 to determine if the maximum value (e.g., 9) has been reached. If not, the key counter (J) is incremented 8, and step 9 is repeated. In this loop, (i.e., steps 8, 9, 11, and 12), step 11 should be reached at most only once. If step 7 is reached for a certain value of I, then step 11 is never reached for that value of I because either a random number is placed in a "skip" position, or a value is calculated from one of the nine formulas. As a result, processing from step 7 proceeds to step 13 after incrementing the skip counter (M) 14, skipping the steps 8, 9, 11, and 12 to save processing time. Once the maximum value of the key counter (J) is reached, processing continues in step 13, where the main counter (I) is tested to determine if it has reached its maximum value of N, which is equal to the length of the message and Key (i.e., the number of digits in the message and Key). If the main counter has not reached its maximum, the key counter (j) is reset 15, and processing continues with step 5, in which the main counter is incremented. Processing ends 16 when the main counter reaches its maximum.

Decryption Process

Figure 2:
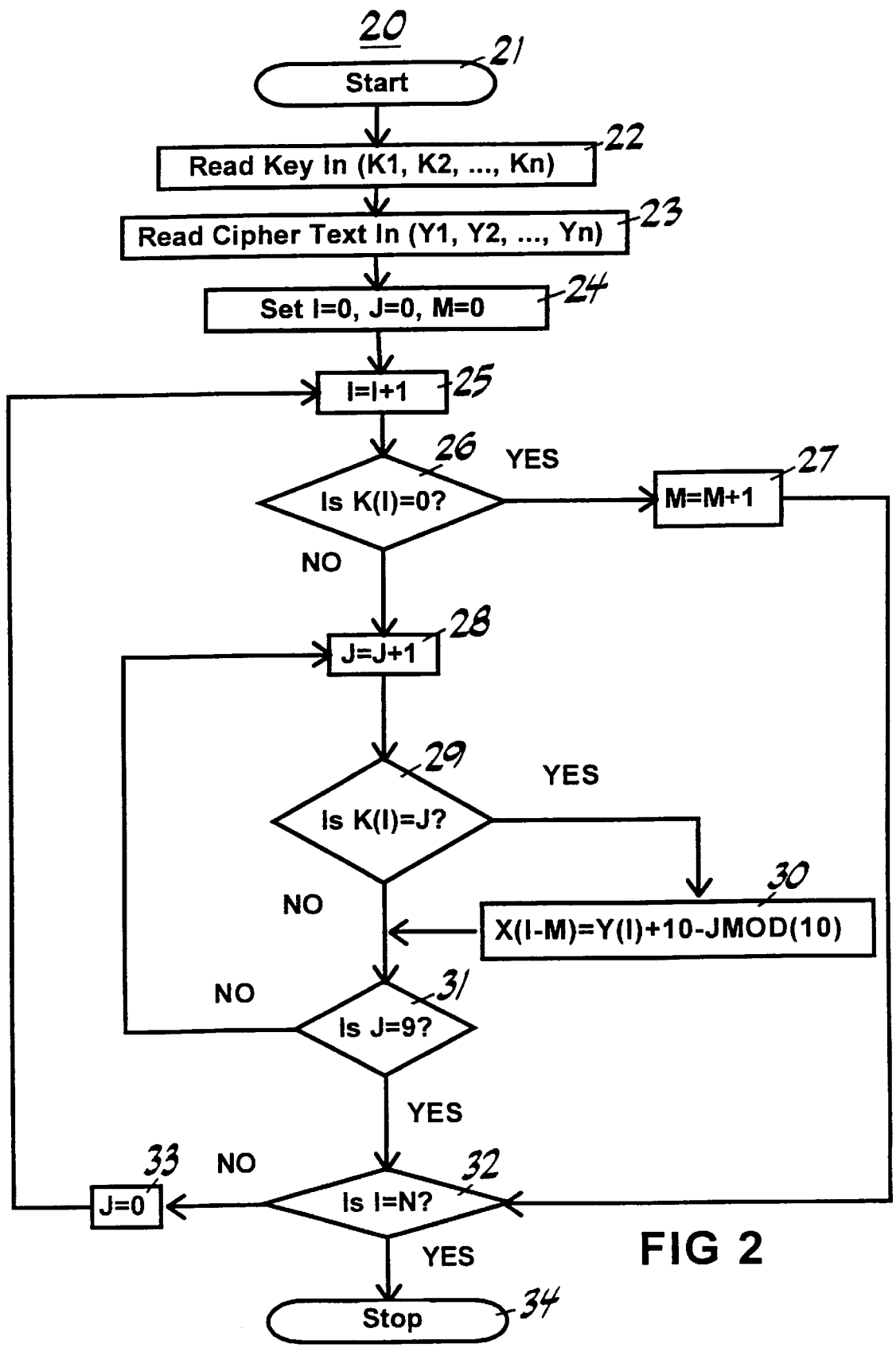
FIG. 2 depicts a flow chart for decrypting a source message according to the method of the present invention.

FIG. 2 depicts a flow chart of the method of the present invention for decrypting the source message 20. Initially, the Key (K1, K2, . . . , Kn) is read into memory in step 22, which is followed by a reading of the cipher text into memory 23. The counters (I, J, M) are then initialized 24, and the main counter (I) is incremented by one 25, since we are counting the digits and keys using ordinal numbers. Next, the method of the present invention tests whether the key for the ith position is zero 26. If so, the skip counted (M) is incremented 27 as this indicates the presence of a skip value, which indicates that the value in this position should be discarded. If not, the process continues to step 28, in which the key counter (J) is incremented. Next, the Key is tested for each successive digit 29, using the key counter (J). Once a match is found (branch YES in step 29), the following formula is now implemented 30:

$$X(I-M)=Y(I)+10-J \ MOD(10).$$

The key counter (J) is then tested 31 to determine if the maximum value (e.g., 9) has been reached. If not, the key counter (J) is incremented 28, and step 29 is repeated. In this loop, (i.e., steps 28, 29, 30, and 31), step 31 should be reached at most only once. If step 27 is reached for a certain value of I, then step 31 is never reached for that value of I because either a random number is placed in a "skip" position, or a value is calculated from one of the nine formulas, but not both. As a result, processing from step 27 proceeds directly to step 32, skipping the steps 28, 29, 30, and 31 to save processing time. Once the maximum value of the key counter (J) is reached, processing continues in step 32, where the main counter (I) is tested to determine if it has reached its maximum value of N, which is equal to the length of the message and Key (i.e., the number of digits in the message and Key). If the main counter has not reached its maximum, the key counter (j) is reset 33, and processing continues with step 25, in which the main counter is incremented. Processing ends 34 when the main counter reaches its maximum.

Embodiments for implementing the flow charts depicted in FIGS. 1–2 are shown below. The two software code processes that are used in the present invention to deliver this security are ENCRYPT and DECRYPT functions. The ENCRYPT function is used to translate the original source information into the cipher text. The DECRYPT function translates the cipher text back into the source. The code logic for these simple functions are:

```
ENCRYPT parameters (X in, Y out)
Read Key in
    K1 = Digit #1 of key
    K2 = Digit #2 of key
    . . .
    Kn = Last Digit of key
Read Source in
    X1 = Digit #1 of Source X
    X2 = Digit #2 of Source X
    . . .
    Xn = Last Digit of Source X
Loop
    If K(loop) = 0
        Set Y(loop) = Random #
    Else If X(loop) = 0
        If K(loop) = 1
            Set Y(loop) = 1
        Else If K(loop) = 2
            Set Y(loop) = 2
        . . .
        Else If K(loop) = 9
            Set Y(loop) = 9
    Else If X(loop) = 1
        If K(loop) = 1
            Set Y(loop) = 2
        Else If K(loop) = 2
            Set Y(loop) = 3
        . . .
        Else If K(loop) = 9
            Set Y(loop) = 0
    . . .
    Else If X(loop) = 9
        If K(loop) = 1
            Set Y(loop) = 0
        Else If K(loop) = 2
            Set Y(loop) = 1
        . . .
        Else If K(loop) = 9
            Set Y(loop) = 8
Return (Y)
! Source is ENCRYPTED into Y as Cipher text
DECRYPT parameters(Y in, X out)
Read Key in
    K1 = Digit #1 of key
    K2 = Digit #2 of key
    . . .
    Kn = Last Digit of key
Read Cipher text in
    Y1 = Digit #1 of Cipher text Y
    Y2 = Digit #2 of Cipher text Y
    . . .
    Yn = Last Digit of Cipher text Y
Loop
    If K(loop) = 0
        ! Back up the counter, because this is a Skip Value
        Set loop = loop-1
    Else If Y(loop) = 0
        If K(loop) = 1
            Set X(loop) = 9
        Else If K(loop) = 2
            Set X(loop) = 8
        . . .
        Else If K(loop) = 9
            Set X(loop) = 0
    Else If Y(loop) = 1
        If K(loop) = 1
            Set X(loop) = 0
```

```
-continued

Else If K(loop) = 2
            Set X(loop) = 9
        . . .
        Else If K(loop) = 9
            Set X(loop) = 1
    . . .
    Else If Y(loop) = 9
        If K(loop) = 1
            Set X(loop) = 8
        Else If K(loop) = 2
            Set X(loop) = 7
        . . .
        Else If K(loop) = 9
            Set X(loop) = 9
Return (X)
! Cipher text is DECRYPTED back into the Source as X
```

One can see from these code abstracts that without having the key value, there is nothing to "steal" from the cipher text. There are no derivations, no reverse-engineering. The present invention delivers true security in an open architecture. ENCRYPT uses the key to translate the original source numeric value into a complex numeric that is completely dependent on that key. And DECRYPT has the same dependence on the key value for translating the cipher text back into the source. Without the key, the system is unbreakable, except for a guess.

Apparatus

Figure 3:
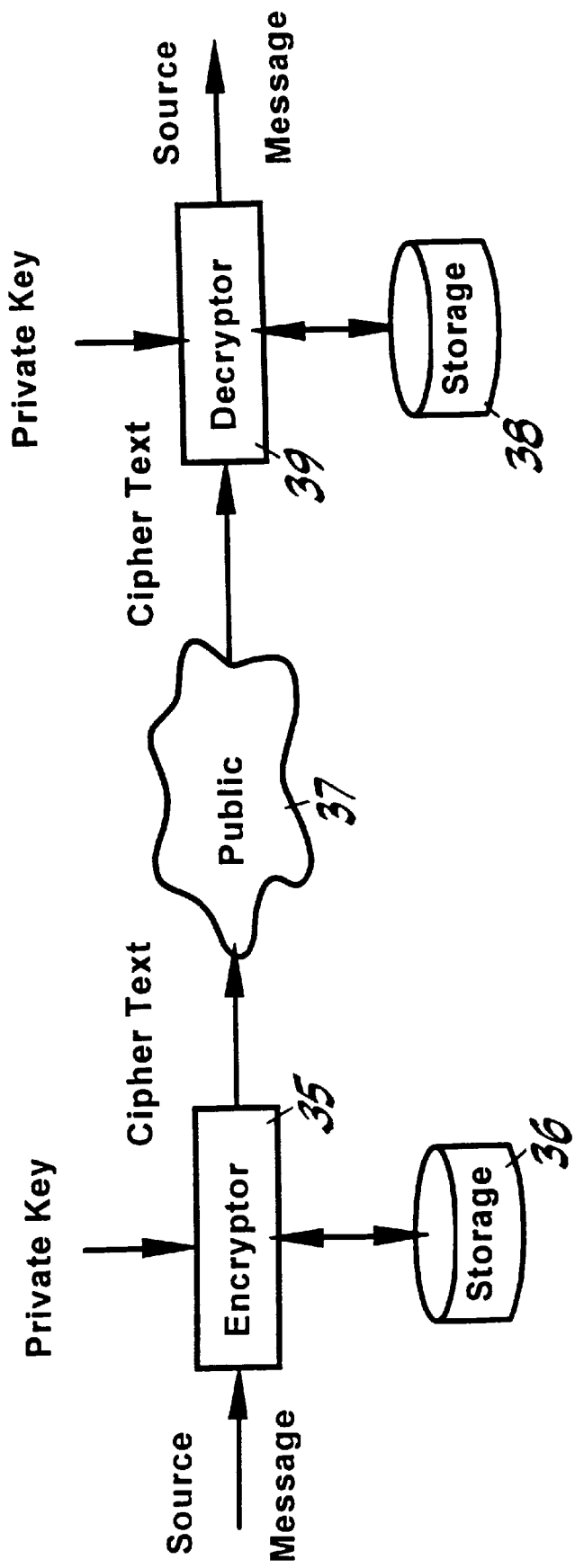
FIG. 3 depicts a block diagram of an apparatus according to the present invention.

FIG. 3 depicts the apparatus of the present invention. The encryptor 35 consists of a general purpose processor, such as a personal computer, programmed to implement the above pseudo code. The code is stored in memory 36, along with the private key. Alternatively, the private key can be inserted manually using a keypad, or any magnetic entry system to enable a code to be placed in memory. Upon receipt of the source message, the encryptor converts the source message to cipher text, as described above. The incoming source message can also be stored in memory for later encrypting, depending upon the application.

Once the source message is in the form of cipher text, the cipher text can be distributed to the public without fear of being deciphered. As shown in FIG. 3, the cipher text can be distributed over a public forum 37 (such as the Internet) to a user employing a decryptor with the appropriate key. Upon receipt of the cipher text the decryptor 39 converts the cipher text to the source message, as described above. Again, storage is provided for the private key and the code. Once decoded, the source message is output or stored in memory for later retrieval.

The system of the present invention can be delivered to a financial institution, credit bank, or any other group having the requirement to secure monetary, numeric transactions. The code can be fashioned into any programming language, and along with a secure distribution mechanism for key delivery, a complete SEMTS is then in place.

The present invention can be implemented in hardware on any processor, in firmware or in software. In the case of software, the present invention can be implemented under any operating system and in any language or format.

What is claimed is:

1. A method for encrypting a numeric message comprising the steps of:
    a) converting each digit of the numeric message to a different value according to one of a plurality of formulae, wherein the plurality of formulae include nine formulae;

b) using a predetermined formula for each digit of the numeric message; and c) using a numerical string to indicate which formula to use for each digit of the message, wherein each digit of the numerical string maps to one formula of the nine formulae;

d) inserting a random number in the cipher text if the numerical string contains a value that does not map to one of the nine formulae; and e) using a succeeding value in the numerical string to indicate which formula to use for a current digit in the message.

2. A method for decrypting a cipher numeric into a source numeric comprising the steps of:

a) converting each digit of the cipher numeric to a different value according to one of a plurality of formulae, wherein the plurality of formulae include nine formulae;

b) using a predetermined formula for each digit of the cipher numeric; and c) using a numerical string to indicate which formula to use for each digit of the cipher numeric, wherein each digit of the numerical string maps to one formula of the nine formulae;

d) deleting a current value in the cipher numeric if the numerical string contains a value that does not map to one of the nine formulae; and e) using a succeeding value in the numerical string to indicate which formula to use for a succeeding digit in the cipher numeric.

3. A method for encrypting and decrypting a numerical string using an ideal key, comprising the steps of:

a) encrypting according to the following steps:
 (i) providing a key having at least n digits, wherein each digit in the key maps to one of nine formulae for converting a single digit into another single digit, each formula returns nine possible values based on an input value to the formula, and never returns the input value, but will return every other possible value;
 (ii) converting each digit of the numerical string into a cipher message using the key from step a)(i);
 (iii) detecting a tenth value in the key that does not map to one of the nine formulae; and
 (iv) inserting a random number in the cipher text upon detecting the tenth value in step a)(iii) and using a next digit in the key to convert a current digit in the source text thereby increasing a length of the cipher text relative to the source text.

4. The method according to claim 3, further comprising the steps of:

b) decrypting according to the following steps:
 (i) providing an identical key to the key provided in step a)(i);
 (ii) converting each digit of the cipher message into the numerical string using the key from step b)(i);
 (iii) detecting a tenth value in the key that does not map to one of the nine formulae; and
 (iv) discarding a current value in the cipher text upon detecting the tenth value in step b)(iii) and using a next digit in the key to convert a next digit in the cipher text.

5. The method according to claim 3, wherein the nine formulae include:

(1) $x+n \; MOD(10)$;

(2) $x+(n+1) \; MOD(10)$;

(3) $x+(n+2) \; MOD(10)$;

(4) $x+(n+3) \; MOD(10)$;

(5) $x+(n+4) \; MOD(10)$;

(6) $x+(n+5) \; MOD(10)$;

(7) $x+(n+6) \; MOD(10)$;

(8) $x+(n+7) \; MOD(10)$; and (9) $x+(n+8) \; MOD(10)$, where $n \geq 0$.

6. A method for decrypting a numerical string using an ideal key, comprising the steps of:

a) providing a key having at least n digits, wherein each digit in the key maps to one of nine formulae for converting a single digit into another single digit, each formula returns nine possible values based on an input value to the formula, and never returns the input value, but will return every other possible value;

b) converting each digit of the numerical string into a source message using the key from step a);

c) detecting a tenth value in the key that does not map to one of the nine formulae; and d) discarding a current value in the cipher text upon detecting the tenth value in step c) and using a next digit in the key to convert a next digit in the cipher text.

* * * * *